United States Patent
Nakayama et al.

(10) Patent No.: US 6,349,540 B1
(45) Date of Patent: Feb. 26, 2002

(54) CATALYST DETERIORATION DETERMINING APPARATUS FOR INTERNAL COMBUSTION ENGINE, AND CONTROL METHOD FOR THE APPARATUS

(75) Inventors: Shigeki Nakayama; Hiroki Matsuoka; Kohei Igarashi, all of Susono; Hiroshi Suwahara, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/664,389

(22) Filed: Sep. 18, 2000

(30) Foreign Application Priority Data

Sep. 30, 1999 (JP) ............................................ 11-279402

(51) Int. Cl.[7] .................................................. F01N 3/00
(52) U.S. Cl. .............................. 60/277; 60/285; 60/274
(58) Field of Search ........................... 60/274, 277, 285

(56) References Cited

U.S. PATENT DOCUMENTS

| | | | | |
|---|---|---|---|---|
| 5,279,116 A | * | 1/1994 | Shimizu et al. | 60/277 |
| 5,724,809 A | * | 3/1998 | Mitsutani et al. | 60/277 |
| 5,732,553 A | * | 3/1998 | Mitsutani | 60/277 |
| 5,735,120 A | * | 4/1998 | Nagai | 60/277 |
| 5,737,917 A | * | 4/1998 | Nagai | 60/277 |
| 5,743,086 A | * | 4/1998 | Nagai | 60/277 |
| 5,848,527 A | * | 12/1998 | Mitsutani | 60/277 |
| 5,887,421 A | * | 3/1999 | Mitsutani | 60/277 |
| 5,979,161 A | * | 11/1999 | Hanafusa et al. | 60/277 |

FOREIGN PATENT DOCUMENTS

| | | |
|---|---|---|
| JP | (P)2826611 | 11/1990 |
| JP | (P)HEI 11-36849 | 9/1998 |

* cited by examiner

*Primary Examiner*—Thomas Denion
*Assistant Examiner*—Diem Tran
(74) *Attorney, Agent, or Firm*—Oblon, Spivak, McClelland, Maier & Neustadt, P.C.

(57) ABSTRACT

A three-way catalyst device having an oxygen absorbing/releasing capability is provided in an exhaust passage of an internal combustion engine. An upstream-side air-fuel ratio sensor that outputs an output value in accordance with the air-fuel ratio of exhaust gas is provided in the exhaust passage upstream of the three-way catalyst device. A downstream-side air-fuel ratio sensor that outputs an output value in accordance with the air-fuel ratio of exhaust gas is provided in the exhaust passage downstream of the three-way catalyst device. A comparison value is calculated by comparing the length of an output locus formed by output values of the upstream-side air-fuel ratio sensor and the length of an output locus formed by output values of the downstream-side air-fuel ratio sensor. By comparing the comparison value with a predetermined criterion, it is determined whether the three-way catalyst device has deteriorated. At least one of the downstream-side air-fuel ratio sensor output value and the predetermined criterion is corrected in accordance with the downstream-side air-fuel ratio sensor output value. Therefore, deterioration of the three-way catalyst device can be determined with high precision.

18 Claims, 8 Drawing Sheets

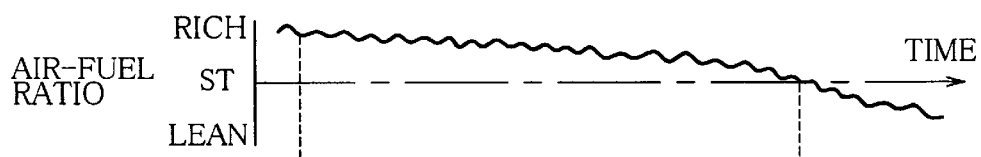
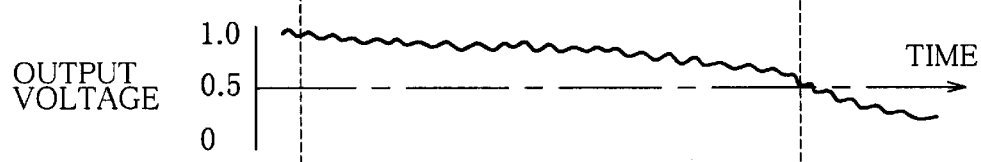
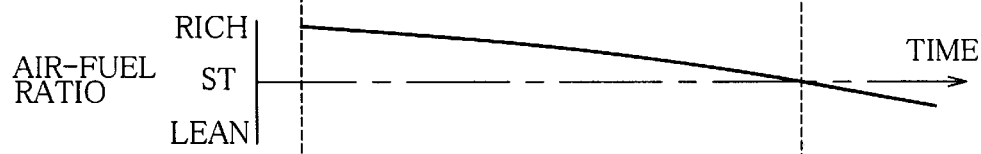
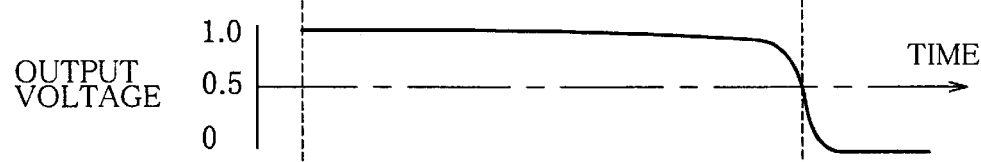
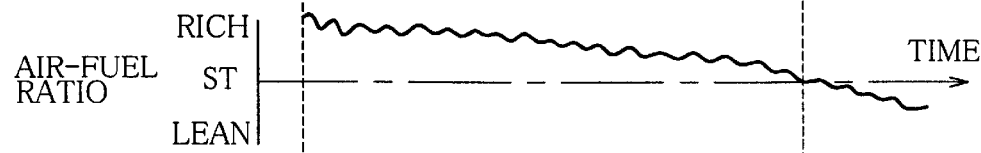
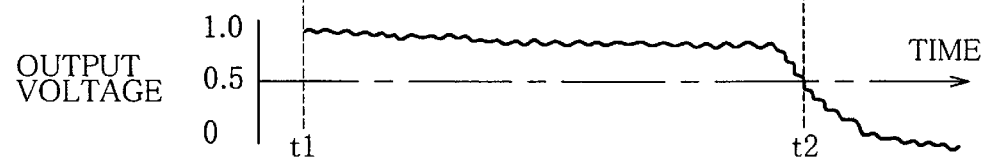

CATALYST DETERIORATION DETERMINING APPARATUS FOR INTERNAL COMBUSTION ENGINE, AND CONTROL METHOD FOR THE APPARATUS

INCORPORATION BY REFERENCE

The disclosure of Japanese Patent Application No. HEI 11-279402 filed on Sep. 30, 1999 including the specification, drawings and abstract is incorporated herein by reference in its entirety.

BACKGROUND OF THE INVENTION

1. Field of the Invention

The invention is directed to emission control apparatuses having three-way catalyst devices for controlling emissions from internal combustion engines.

2. Description of the Related Art

There are known emission control apparatuses having three-way catalyst devices for controlling emissions from internal combustion engines. A three-way catalyst device is capable of simultaneously lessening three components of exhaust gas from an engine, that is, oxides of nitrogen (NOx), hydrocarbons (HC), and carbon monoxide (CO), at high removal rates when the air-fuel ratio of exhaust gas flowing into to the three-way catalyst device (hereinafter, referred to as "inflow exhaust air-fuel ratio") is at a stoichiometric air-fuel ratio. That is, in order to simultaneously lessen the three components, i.e., NOx, HC, and CO, at high removal rates, it is necessary to keep the inflow exhaust air-fuel ratio substantially at the stoichiometric air-fuel ratio.

However, it is very difficult to continuously keep the inflow exhaust air-fuel ratio accurately at the stoichiometric air-fuel ratio. Therefore, in an emission control apparatus for an internal combustion engine disclosed in Japanese Patent Application Laid-Open No. HEI 11-36849, as for example, a three-way catalyst device is provided with an oxygen absorbing/releasing capability of absorbing oxygen when the inflow exhaust air-fuel ratio is on a fuel-lean side of the stoichiometric air-fuel ratio, and of releasing absorbed oxygen when the inflow exhaust air-fuel ratio is on the fuel-rich side of the stoichiometric air-fuel ratio, and the inflow exhaust air-fuel ratio is controlled so that the inflow exhaust air-fuel ratio cyclically changes between the rich and lean sides of the stoichiometric air-fuel ratio and, as a result, the overall inflow exhaust air-fuel ratio becomes substantially equal to the stoichiometric air-fuel ratio. That is, when the inflow exhaust air-fuel ratio is on the rich side of the stoichiometric air-fuel ratio, oxygen absorbed in the three-way catalyst device is released into exhaust gas flowing through the three-way catalyst device, so that the inflow exhaust air-fuel ratio becomes substantially equal to the stoichiometric air-fuel ratio. When the inflow exhaust air-fuel ratio is on the lean side of the stoichiometric air-fuel ratio, oxygen in exhaust gas is absorbed into the three-way catalyst device, so that the inflow exhaust air-fuel ratio becomes substantially equal to the stoichiometric air-fuel ratio.

The three-way catalyst device becomes unable to simultaneously remove the three undesirable components of the exhaust gas when the three-way catalyst device deteriorates, in most cases this means when the oxygen absorbing/releasing capability decreases. Therefore, in the emission control apparatus disclosed in the aforementioned laid-open patent application, deterioration of the three-way catalyst device is evaluated by using outputs from two air-fuel ratio sensors disposed in exhaust passages upstream and downstream of the three-way catalyst device.

That is, the air-fuel ratio sensor disposed upstream of the three-way catalyst device (hereinafter, referred to as "upstream-side air-fuel ratio sensor") outputs an output value corresponding to the air-fuel ratio of exhaust gas that is about to flow into the three-way catalyst device. Since the inflow exhaust air-fuel ratio is controlled so as to cyclically change between the rich and lean sides of the stoichiometric air-fuel ratio as mentioned above, the upstream-side air-fuel ratio sensor alternately outputs relatively high output values corresponding to rich-side air-fuel ratios and relatively low output values corresponding to lean-side air-fuel ratios. On the other hand, the air-fuel ratio sensor disposed downstream of the three-way catalyst device (hereinafter, referred to as "downstream-side air-fuel ratio sensor") outputs an output value corresponding to the air-fuel ratio of exhaust gas that has passed through the three-way catalyst device. Since the three-way catalyst device has the oxygen absorbing/releasing capability as described above, the three-way catalyst device eliminates relatively small fluctuations, that is, increases and decreases, of the inflow exhaust air-fuel ratio that occur in short cycles. Therefore, the downstream-side air-fuel ratio sensor alternately outputs only relatively high output values corresponding to rich-side air-fuel ratios and relatively low output values corresponding to lean-side air-fuel ratios in fluctuation cycles that are longer than the fluctuation cycles of the output value of the upstream-side air-fuel ratio sensor, as long as the three-way catalyst device operates normally.

However, when the three-way catalyst device has deteriorated, the three-way catalyst device does not eliminate repeated short term increases and decreases in the inflow exhaust air-fuel ratio, so that the output value of the downstream-side air-fuel ratio sensor fluctuates in shorter cycles than when the three-way catalyst device is normal.

Therefore, the emission control apparatus disclosed in the aforementioned laid-open patent application calculates a ratio of the length of an output locus formed by output values of the downstream-side air-fuel ratio sensor (hereinafter, referred to as "downstream-side locus length") to the length of an output locus formed by output values of the upstream-side air-fuel ratio sensor, and determines that the three-way catalyst device has deteriorated when the ratio becomes greater than a predetermined criterion value.

The emission control apparatus disclosed in the aforementioned laid-open patent application is based on an assumption that the downstream-side locus length increases proportionally to the fluctuation of the air-fuel ratio of exhaust gas flowing out of the three-way catalyst device (hereinafter, referred to as "outflow exhaust air-fuel ratio"). In reality, however, the downstream-side locus length does not necessarily increase proportionally to the fluctuation of the outflow exhaust air-fuel ratio, due to an output characteristic of the downstream-side air-fuel ratio sensor. More specifically, the amount of change in the output value of the downstream-side air-fuel ratio sensor per unit amount of change in the exhaust air-fuel ratio is relatively small in a range where, for example, the degree of fuel-richness of the exhaust air-fuel ratio is relatively great, and it is relatively great in a range where the degree of fuel-richness of the exhaust air-fuel ratio is relatively small. That is, if the exhaust air-fuel ratio fluctuates within the range where the degree of fuel-richness is relatively great, the change in the downstream-side locus length is relatively small.

In this case, therefore, it is erroneously determined that the three-way catalyst device has not deteriorated, even if the three-way catalyst device has actually deteriorated.

SUMMARY OF THE INVENTION

Accordingly, it is an object of the invention to determine deterioration of a three-way catalyst device with good precision.

To achieve the aforementioned and other objects, a catalyst deterioration determining apparatus for an internal combustion engine in accordance with an aspect of the invention includes a three-way catalyst device with an oxygen absorbing/releasing capability that is disposed in an exhaust passage of the engine, and an upstream-side air-fuel ratio sensor disposed in a portion of the exhaust passage located upstream of the three-way catalyst device. The upstream-side air-fuel ratio sensor outputs an output value in accordance with the air-fuel ratio of exhaust gas. Furthermore, a downstream-side air-fuel ratio sensor that outputs an output value in accordance with the air-fuel ratio of exhaust gas is provided in the exhaust passage downstream of the three-way catalyst device. The apparatus calculates a comparison value by comparing the length of an output locus formed by output values of the upstream-side air-fuel ratio sensor and the length of an output locus formed by output values of the downstream-side air-fuel ratio sensor. By comparing the comparison value with a predetermined criterion value, the apparatus determines whether the three-way catalyst device has deteriorated. For the determination, at least one of the downstream-side air-fuel ratio sensor output value and the predetermined criterion value is corrected in accordance with the downstream-side air-fuel ratio sensor output value.

Since an air-fuel ratio varies in its output characteristic in accordance with the output value, the change in the length of the locus formed by output values of the downstream-side air-fuel ratio sensor caused by deterioration of the three-way catalyst device also varies in accordance with the output value of the downstream-side air-fuel ratio sensor. However, since the invention uses a predetermined criterion value or an output value of the downstream-side air-fuel ratio sensor corrected in accordance with the output value of the downstream-side air-fuel ratio sensor, it becomes possible to determine deterioration of the three-way catalyst device with good precision.

In a catalyst deterioration determining method in accordance with another aspect of the invention, a first output value is acquired from an upstream-side air-fuel ratio sensor positioned upstream of a three-way catalyst device disposed in an exhaust gas of an internal combustion engine, the first output value being in accordance with an air-fuel ratio of exhaust gas flowing into the three-way catalyst device. A second output value is acquired from a downstream-side air-fuel ratio sensor positioned downstream of the three-way catalyst device, the second output value being in accordance with the air-fuel ratio of exhaust gas flowing out of the three-way catalyst device. A comparison value is calculated by comparing the length of an output locus formed by the first output value and the length of an output locus formed by the second output value. By comparing the comparison value with a predetermined criterion value, it is determined whether the three-way catalyst device has deteriorated. For the determination, at least one of the second output value of the downstream-side air-fuel ratio sensor and the predetermined criterion value is corrected in accordance with the second output value.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein:

FIGS. 7A to 7F are time charts for illustrating determination of catalyst deterioration according to the invention;

DETAILED DESCRIPTION OF PREFERRED EMBODIMENT

A preferred embodiment of the catalyst deterioration determining apparatus of the invention will be described hereinafter with reference to the accompanying drawings.

Figure 1:
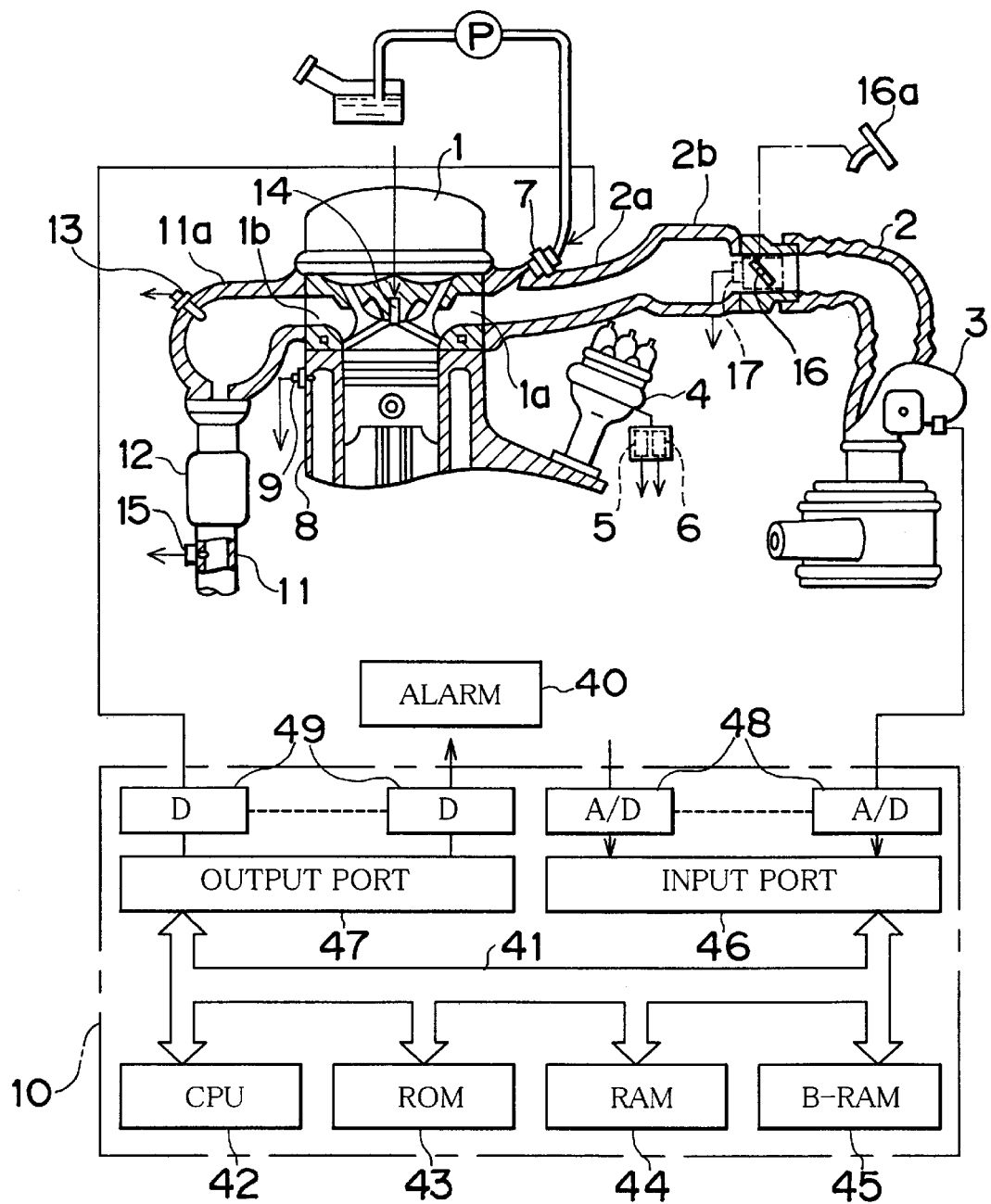
FIG. 1 is a diagram illustrating an overall construction of an internal combustion engine equipped with a catalyst deterioration determining apparatus according to the invention.

An overall construction of an internal combustion engine including a catalyst deterioration determining apparatus according to the invention will be described with reference to FIG. 1. FIG. 1 shows an embodiment where the catalyst deterioration determining apparatus of the invention is applied to an internal combustion engine. An engine body 1 is shown in FIG. 1. An intake manifold 2a is connected to intake ports 1a of cylinders of the engine body 1. The intake manifold 2a is connected to an intake passage 2 via a common surge tank 2b. The intake passage 2 is provided with an air flow meter 3 for detecting the amount of air taken into the engine body 1. The intake passage 2 is further provided with a throttle valve 16 that is operated to a degree of opening corresponding to the amount of operation of an accelerator pedal 16a. Disposed near the throttle valve 16 is an idle switch 17 that generates a signal indicating an idle state when the throttle valve 16 is fully closed. Fuel injection valves 7 are disposed in portions of the intake manifold 2a located near the intake ports 1a of the individual cylinders. The fuel injection valves 7 are opened in accordance with signals from a control circuit 10 described below, so as to inject pressurized fuel into the intake ports 1a of the cylinders. The engine body 1 also has ignition plugs 14 for igniting fuel in the cylinders of the engine.

An exhaust manifold 11a is connected to exhaust ports 1b of the engine body 1. The exhaust manifold 11a is connected to an exhaust passage 11. The exhaust passage 11 is provided with a catalytic converter 12. The catalytic converter 12 contains a three-way catalyst device.

Figure 2:
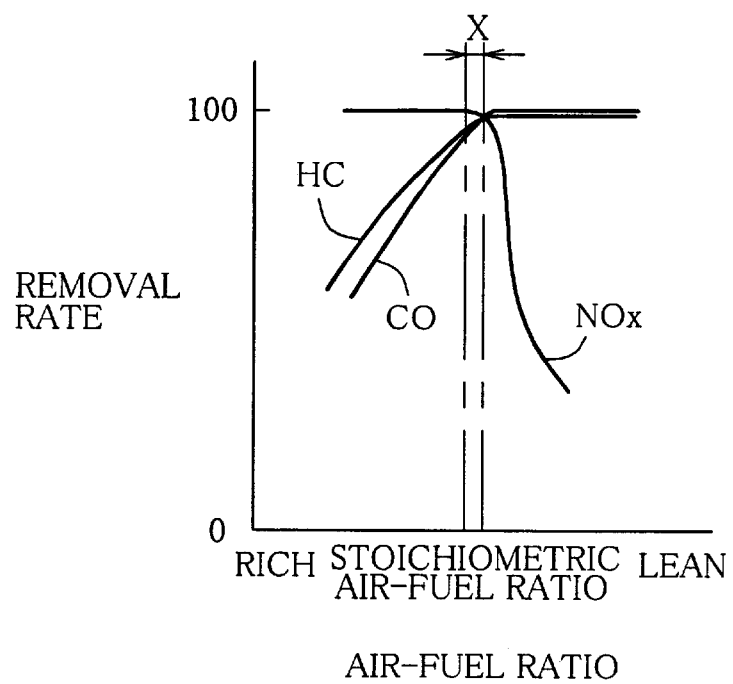
FIG. 2 is a diagram indicating the emission removing function of a three-way catalyst device.

The three-way catalyst device removes substantially 100% of NOx when the air-fuel ratio of exhaust gas that is about to flow into the three-way catalyst device (hereinafter, referred to as "inflow exhaust air-fuel ratio") is on a fuel-rich side of a stoichiometric air-fuel ratio, as indicated in FIG. 2. Conversely, when the inflow exhaust air-fuel ratio is on the fuel-lean side of the stoichiometric air-fuel ratio, the three-way catalyst device removes substantially 100% of HC and CO. Therefore, the three-way catalyst device is able to simultaneously remove NOx, HC, and CO at high removal rates only when the inflow exhaust air-fuel ratio equals the stoichiometric air-fuel ratio. Furthermore, the three-way catalyst device has an oxygen absorbing capability of absorbing oxygen from exhaust gas when the inflow exhaust air-fuel ratio is on the lean side of the stoichiometric air-fuel ratio, and an oxygen releasing capability of releasing absorbed oxygen when the inflow exhaust air-fuel ratio is on the rich side.

Figure 3:
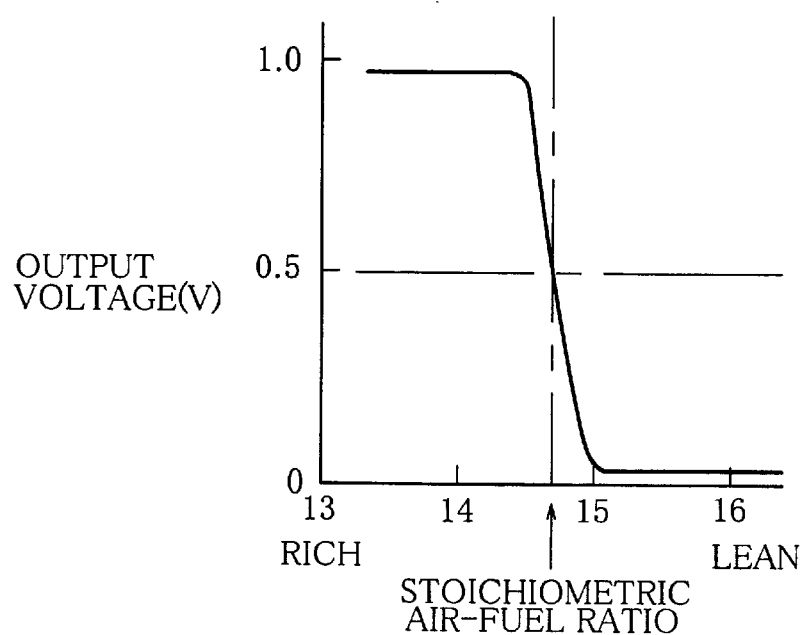
FIG. 3 is a diagram indicating an output characteristic of an air-fuel ratio.

An upstream-side air-fuel ratio sensor 13 is disposed in a portion of the exhaust passage 11 located upstream of the catalytic converter 12. A downstream-side air-fuel ratio sensor 15 is disposed in portion of the exhaust passage 11 located downstream of the catalytic converter 12. In this embodiment, the air-fuel ratio sensors 13, 15 are $O_2$ sensors that output voltage in accordance with the oxygen concentration in exhaust gas. The $O_2$ sensors output a voltage of substantially 0 V when the exhaust air-fuel ratio is on the lean side of the stoichiometric air-fuel ratio, as indicated in FIG. 3. When the exhaust air-fuel ratio is on the rich side of the stoichiometric air-fuel ratio, the $O_2$ sensors output a voltage of about 1V. In a range around the stoichiometric air-fuel ratio, the output voltage of each $O_2$ sensor sharply changes, and changes across a voltage $V_R$ that corresponds to the stoichiometric air-fuel ratio. That is, the $O_2$ sensors output different values of voltage in accordance with whether the exhaust air-fuel ratio is on the lean or rich side of the stoichiometric air-fuel ratio.

An ignition distributor 4 of the engine body 1 is provided with two crank angle sensors 5, 6 each of which generates a pulse signal at every predetermined rotation angle of an engine crankshaft. In this embodiment, the crank angle sensor 5 outputs a reference position-detecting pulse signal, for example, every time a compression top dead center is reached in a specified cylinder (that is, at every crank rotation angle of 720°), and the crank angle sensor 6 outputs a crank rotation angle-detecting pulse signal, for example, at every crank angle of 30°.

A water jacket 8 of a cylinder block of the engine body 1 is provided with a cooling water temperature sensor 9 that outputs voltage in accordance with the temperature of engine cooling water.

The control circuit 10 has a CPU (microprocessor) 42, a ROM (read-only memory) 43, a RAM (random access memory) 42, a B-RAM (backup RAM) 45, an input port 46, and an output port 47 that are interconnected by a bidirectional bus 41. Output voltages of the air flow meter 3, the cooling water temperature sensor 9, the air-fuel ratio sensors 13, 15, and the idle switch 17 are inputted to the input port 46 via corresponding A/D converters 48. Output voltages of the crank angle sensors 5, 6 are directly inputted to the input port 46. The output port 47 is connected to the fuel injection valves 7, the ignition plugs 14, and an alarm 40, via corresponding drive circuits 49.

Before the operation of the catalyst deterioration determining apparatus according to the invention is described, a control of bringing the inflow exhaust air-fuel ratio to a target air-fuel ratio will be described. This air-fuel ratio control includes substantially two controls.

One of the controls is a control of calculating an open valve duration of the fuel injection valves that is needed for the fuel injection valves to inject an amount of fuel that is needed to bring the inflow exhaust air-fuel ratio to the target air-fuel ratio. The other is a control of detecting an actual inflow exhaust air-fuel ratio and, based on the detected inflow exhaust air-fuel ratio, calculating an air-fuel ratio correction factor for correcting the open valve duration of the fuel injection valves, that is, the air-fuel ratio.

Figure 4:
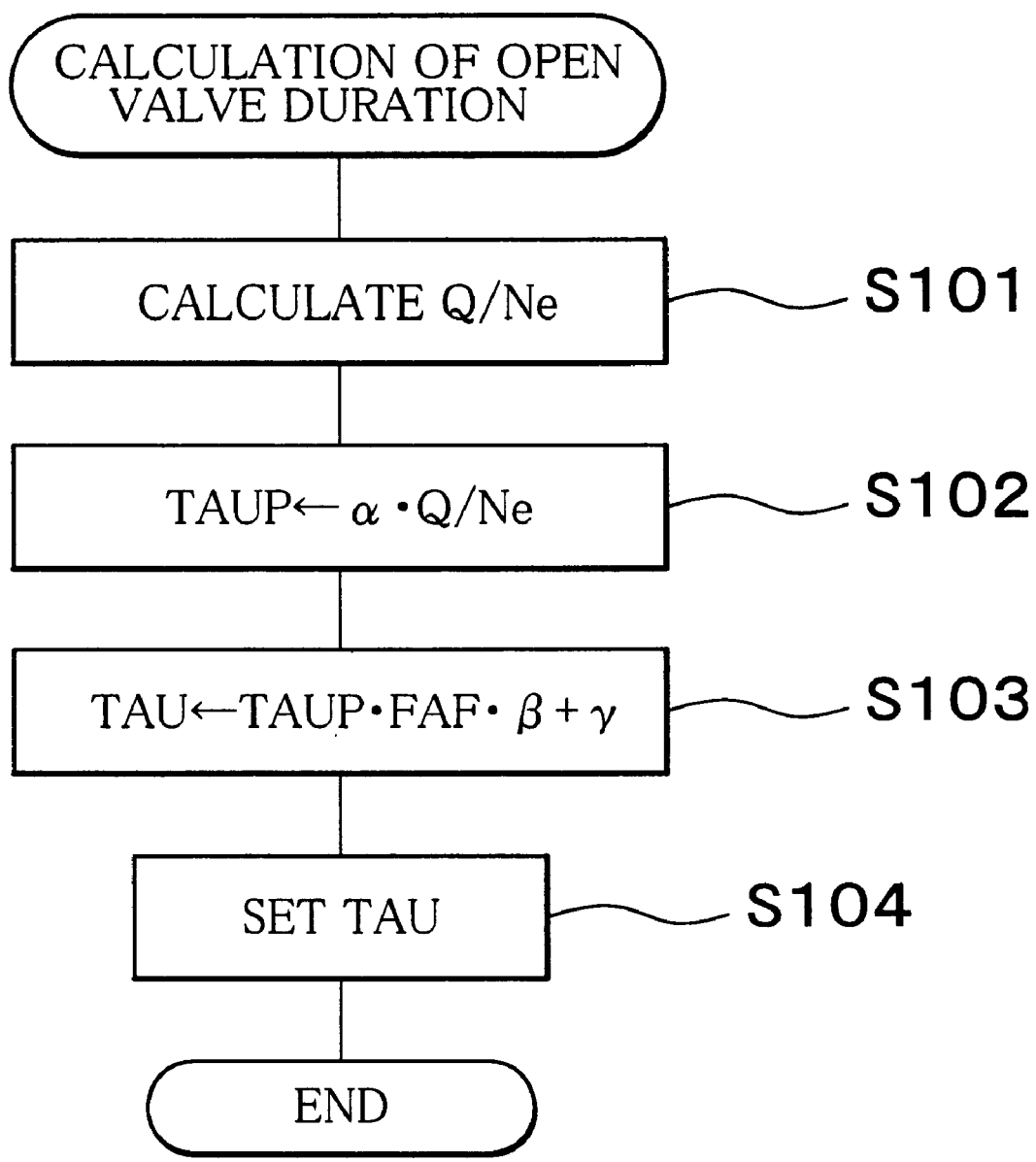
FIG. 4 is a flowchart for calculation of a fuel injection duration.

First, the calculation of an open valve duration of the fuel injection valves will be described with reference to the flowchart in FIG. 4. First in step 101, an amount intake air per engine revolution Q/Ne is calculated from the amount of intake air Q detected by the air flow meter 3 and the engine revolution speed Ne calculated based on the detection data provided by the crank angle sensors 5, 6. Subsequently in step 102, a basic fuel injection duration TAUP is calculated as in an equation TAUP=α×Q/Ne. The basic fuel injection duration TAUP is a fuel injection duration that is needed to bring the air-fuel ratio of an air-fuel mixture supplied to each cylinder to the target air-fuel ratio. In the equation, α is a constant.

Subsequently in step 103, an actual fuel injection duration TAU is calculated as in an equation TAU=TAUP×FAF×β+γ. In the equation, FAF is an air-fuel ratio correction factor calculated in a flowchart described below, and β, γ are constants that are determined in accordance with the engine operational states. Subsequently in step 104, the actual fuel injection duration TAU is set, so that an amount of fuel corresponding to the actual fuel injection duration TAU is injected from each fuel injection valve 7.

The control of calculating the air-fuel ratio correction factor FAF will be first described briefly, and then will be described in detail with reference to a flowchart. Description below will be made in conjunction with a case where the target air-fuel ratio is set to a ratio that is slightly to the rich side of the stoichiometric air-fuel ratio, for the following reasons.

As mentioned above, the three-way catalyst device is able to simultaneously remove NOx, HC, and CO at high removal rates when the inflow exhaust air-fuel ratio equals the stoichiometric air-fuel ratio. However, in reality, it is very difficult to always keep the inflow exhaust air-fuel ratio equal to the stoichiometric air-fuel ratio. Therefore, it is permissible to provide a three-way catalyst device with an oxygen absorbing/releasing capability and control the air-fuel ratio so that the inflow exhaust air-fuel ratio alternates between the rich and lean sides of the stoichiometric air-fuel ratio and, as a result, the overall inflow exhaust air-fuel ratio becomes equal to the stoichiometric air-fuel ratio. However, although the oxygen absorbing/releasing capability of the three-way catalyst device makes it possible to keep the inflow exhaust air-fuel ratio approximately equal to the stoichiometric air-fuel ratio, the oxygen absorbing/releasing capability does not make it possible to keep the inflow exhaust air-fuel ratio perfectly equal to the stoichiometric air-fuel ratio. Considering this circumstance, it can be understood that a drawback occurs as follows. That is, as is apparent from FIG. 2, if the inflow exhaust air-fuel ratio shifts to the rich side of the stoichiometric air-fuel ratio, the HC removal rate and the CO removal rate decrease while the NOx removal rate remains approximately at 100%. However, the extent of such decreases in the HC removal rate and the CO removal rate is less than the extent of a decrease in the NOx removal rate that occurs when the inflow exhaust air-fuel ratio shifts to the lean side of the stoichiometric air-fuel ratio. Therefore, in order to remove the three components, i.e., NOx, HC, and CO, at high removal rates as a whole and, in particular, curb the amount of NOx discharged from the three-way catalyst device to a low level, it is desirable to control the air-fuel ratio so that the inflow exhaust air-fuel ratio becomes equal to an air-fuel ratio that is slightly to the rich side of the stoichiometric air-fuel ratio.

In view of these circumstances, the air-fuel ratio is controlled so that the inflow exhaust air-fuel ratio becomes equal to a ratio that is slightly to the rich side of the stoichiometric air-fuel ratio, and so that the inflow exhaust air-fuel ratio fluctuates within a range X indicated in FIG. 2, in this embodiment.

The calculation of the air-fuel ratio correction factor FAF in this embodiment will be described. As can be understood from the fuel injection duration TAU-determining equation, TAU=TAUP×FAF×β+γ, an increase in the air-fuel ratio correction factor FAF increases the fuel injection duration TAU, and therefore increases the degree of fuel-richness of the inflow exhaust air-fuel ratio. On the other hand, a decrease in the air-fuel ratio correction factor FAF reduces the fuel injection duration TAU, and therefore increases the degree of fuel-leanness of the inflow exhaust air-fuel ratio.

While it is detected by the upstream-side air-fuel ratio sensor 13 that the inflow exhaust air-fuel ratio is on the rich side of the target air-fuel ratio (an air-fuel ratio that is slightly to the rich side of the stoichiometric air-fuel ratio in this embodiment), the air-fuel ratio correction factor FAF is gradually decreased. Therefore, the fuel injection duration TAU is reduced, so that the degree of richness of the inflow exhaust air-fuel ratio decreases. Conversely, while it is detected by the upstream-side air-fuel ratio sensor 13 that the inflow exhaust air-fuel ratio is on the lean side of the target air-fuel ratio, the air-fuel ratio correction factor FAF is gradually increased. Therefore, the fuel injection duration TAU is increased, so that the degree of richness of the inflow exhaust air-fuel ratio increases. In this manner, the inflow exhaust air-fuel ratio is kept within the vicinity of the target air-fuel ratio.

In this embodiment, a control as described below is performed in order to bring the inflow exhaust air-fuel ratio, which has departed from a target air-fuel ratio, back to the target air-fuel ratio as quickly as possible. That is, the downstream-side air-fuel ratio sensor 15 detects the air-fuel ratio of exhaust gas discharged from the three-way catalyst device (hereinafter, referred to as "outflow exhaust air-fuel ratio"). It is noted herein that the output value from the downstream-side air-fuel ratio sensor 15 fluctuates across the voltage value corresponding to the target air-fuel ratio in relatively long cycles. If the duration during which the output of the downstream-side air-fuel ratio sensor 15 indicates that the outflow exhaust air-fuel ratio is on the rich side (hereinafter, referred to as "rich output duration") is long, it means that the degree of richness of the inflow exhaust air-fuel ratio has been corrected to a relatively great value. Therefore, in this embodiment, the air-fuel ratio correction factor is greatly decreased in a rapid manner so that the degree of richness of the inflow exhaust air-fuel ratio decreases more quickly if the rich output duration is longer.

Conversely, if the duration during which the output of the downstream-side air-fuel ratio sensor indicates that the outflow exhaust air-fuel ratio is on the lean side (hereinafter, referred to as "lean output duration") is long, it means that the degree of leanness of the inflow exhaust air-fuel ratio has been corrected to a relatively great value. Therefore, in this embodiment, the air-fuel ratio correction factor is greatly increased in a rapid manner so that the degree of leanness of the inflow exhaust air-fuel ratio decreases more quickly if the lean output duration is longer. In this manner, the inflow exhaust air-fuel ratio is kept in the vicinity of the target air-fuel ratio with an increased precision.

Figure 5:
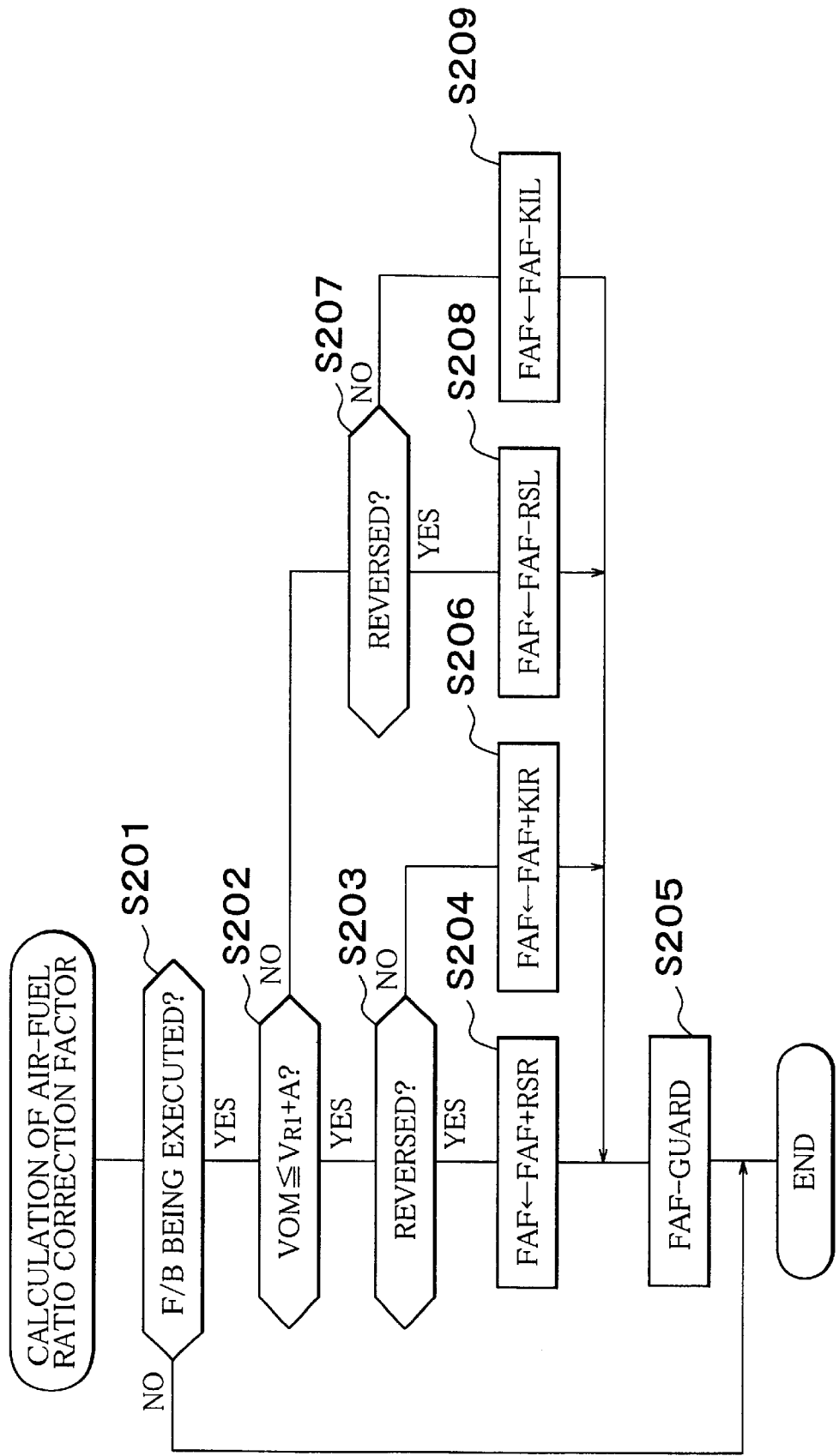
FIG. 5 is a flowchart for calculation of a air-fuel ratio correction factor.

Next, the control of calculating the air-fuel ratio correction factor will be described in detail with reference to the flowcharts of FIGS. 5 and 6. Referring to the flowchart of FIG. 5, first in step 201, it is determined whether a condition for executing an air-fuel ratio feedback control (hereinafter, referred to as "feedback execution condition") is met, that is it is determined based on the outputs of the air-fuel ratio sensors whether a feedback control of calculating an air-fuel ratio correction factor FAF is being executed. The feedback execution condition in this embodiment may be, for example, a condition that the air-fuel ratio sensors have been activated, a condition that the engine warm-up has been completed, a condition that a predetermined time has elapsed following discontinuation of a fuel cut process of temporarily stopping the fuel injection, etc. If it is determined in step 201 that the feedback control is being executed, the process proceeds to step 202 in which it is determined whether the output voltage VOM of the upstream-side air-fuel ratio sensor 13 is at most a value obtained by adding a predetermined factor A to a reference output value $V_{R1}$ corresponding to the stoichiometric air-fuel ratio (VOM≦$V_{R1}$+A). That is, it is determined whether the inflow exhaust air-fuel ratio is on the lean side of the target air-fuel ratio.

If it is determined in step 202 that VOM≦$V_{R1}$+A, it is considered that the inflow exhaust air-fuel ratio is on the lean side, and the process proceeds to step 203 in order to decrease the degree of leanness of the inflow exhaust air-fuel ratio. In step 203, it is determined whether the output voltage of the upstream-side air-fuel ratio sensor 13 has reversed from the rich side to the lean side of the target air-fuel ratio. If it is determined in step 203 that the output voltage of the upstream-side air-fuel ratio sensor 13 has so reversed, the process proceeds to step 204, in which the air-fuel ratio correction factor FAF is relatively greatly increased by a skip increase amount RSR in a rapid manner. Conversely, if it is determined in step 203 that the output voltage of the upstream-side air-fuel ratio sensor 13 has not reversed, the process proceeds to step 206, in which the air-fuel ratio correction factor FAF is relatively slightly increased by a constant KIR. Thus, immediately after the inflow exhaust air-fuel ratio changes to the lean side of the target air-fuel ratio, the air-fuel ratio correction factor FAF is increased so that the degree of leanness of the inflow exhaust air-fuel ratio decreases in a rapid manner. After that, the air-fuel ratio correction factor FAF is increased so that the degree of leanness of the inflow exhaust air-fuel ratio gradually decreases.

If it is determined in step 202 that VOM>$V_{R1}$+A, it is considered that the inflow exhaust air-fuel ratio is on the rich side, and the process proceeds to step 207 in order to decrease the degree of richness of the inflow exhaust air-fuel ratio. In step 207, it is determined whether the output voltage of the upstream-side air-fuel ratio sensor 13 has reversed from the lean side to the rich side of the target air-fuel ratio. If it is determined in step 207 that the output voltage of the upstream-side air-fuel ratio sensor 13 has reversed so, the process proceeds to step 208, in which the air-fuel ratio correction factor FAF is relatively greatly decreased in a rapid manner by a skip decrease amount RSL. Conversely, if it is determined in step 207 that the output voltage of the upstream-side air-fuel ratio sensor 13 has not reversed, the process proceeds to step 209, in which the air-fuel ratio correction factor FAF is relatively slightly decreased by a constant KIL. Thus, immediately after the inflow exhaust air-fuel ratio changes to the rich side of the target air-fuel ratio, the air-fuel ratio correction factor FAF is decreased so that the degree of richness of the inflow exhaust air-fuel ratio decreases in a rapid manner. After that, the air-fuel ratio correction factor FAF is decreased so that the degree of richness of the inflow exhaust air-fuel ratio gradually decreases.

In step 205, an air-fuel ratio correction factor FAF-guarding process is performed so that the air-fuel ratio correction factor FAF remains between its permissible minimum and its permissible maximum.

Figure 6:
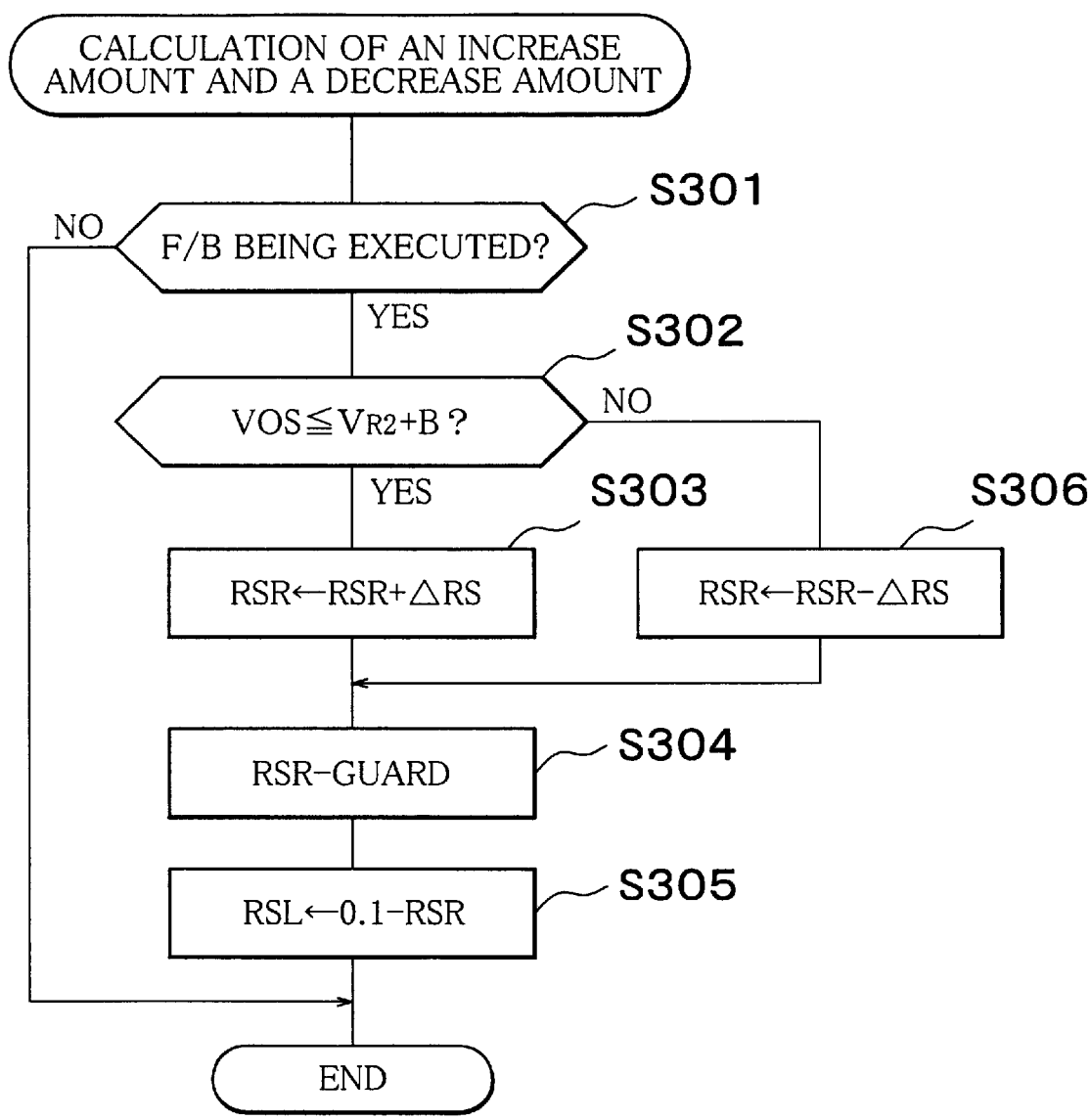
FIG. 6 is a flowchart for calculation of a skip increase amount and a skip decrease amount.

Referring to the flowchart of FIG. 6, first in step 301, it is determined whether a condition for executing the air-fuel ratio feedback control is met. That is, it is determined whether the feedback control is being executed. The condition herein includes a condition where the engine is not being idled, in addition to the conditions mentioned above in conjunction with the flowchart of FIG. 5. If it is determined in step 301 that the feedback control is being executed, the process proceeds to step 302, in which it is determined whether the output voltage VOS of the downstream-side air-fuel ratio sensor 15 is at most a value obtained by adding a predetermined value B to a value $V_{R2}$ corresponding to the stoichiometric air-fuel ratio (VOS≦$V_{R2}$+B). That is, it is determined whether the outflow exhaust air-fuel ratio is on the lean side of the target air-fuel ratio. If it is determined in step 302 that VOS≦$V_{R2}$+B, it is considered that the outflow exhaust air-fuel ratio is on the lean side, and the process proceeds to step 303, in which the skip increase amount RSR for the air-fuel ratio correction factor FAF is increased by a predetermined value ΔRS. Conversely, if it is determined in step 302 that VOS>$V_{R2}$+B, it is considered that the outflow exhaust air-fuel ratio is on the rich side, and the process proceeds to step 306, in which the skip increase amount RSR for the air-fuel ratio correction factor FAF is decreased by the predetermined value ΔRS In step 304, the skip increase amount RSR is guarded so that the skip increase amount RSR remains between its permissible minimum and its permissible maximum. Subsequently in step 305, a skip decrease amount RSL for the air-fuel ratio correction factor FAF is calculated by subtracting the skip increase amount RSR from 0.1.

Next, determination of catalyst deterioration in this embodiment will be described with reference to FIGS. 7A to 7F. Referring to the time chart of FIG. 7A indicating fluctuations of the inflow exhaust air-fuel ratio, the inflow exhaust air-fuel ratio is on the rich side of the stoichiometric air-fuel ratio at time point $t_1$. After that, the degree of richness of the inflow exhaust air-fuel ratio gradually decreases with repeated increase-decrease patterns of relatively short cycles. The inflow exhaust air-fuel ratio becomes equal to the stoichiometric air-fuel ratio at time point $t_2$, and then changes to the lean side of the stoichiometric air-fuel ratio. When the inflow exhaust air-fuel ratio fluctuates in this manner, the output voltage of the upstream-side air-fuel ratio sensor 13 fluctuates approximately correspondingly to the fluctuations of the inflow exhaust air-fuel ratio, as indicated in FIG. 7B. Referring to FIG. 7C indicating fluctuations of the outflow exhaust air-fuel ratio occurring when the three-way catalyst device functions normally, the outflow exhaust air-fuel ratio is on the rich side of the stoichiometric air-fuel ratio at time point $t_1$. After that, the degree of richness of the outflow exhaust air-fuel ratio gradually decreases without repeated increase-decrease patterns. The outflow exhaust air-fuel ratio becomes equal to the stoichiometric air-fuel ratio at time point $t_2$, and then changes to the lean side of the stoichiometric air-fuel ratio.

When the outflow exhaust air-fuel ratio fluctuates in this manner, the output voltage of the downstream-side air-fuel ratio sensor 15 fluctuates approximately corresponding to the fluctuations of the outflow exhaust air-fuel ratio, as indicated in FIG. 7D.

However, referring to FIG. 7E indicating fluctuations of the outflow exhaust air-fuel ratio occurring when the three-way catalyst device has deteriorated, the outflow exhaust air-fuel ratio fluctuates substantially in the same manner as the inflow exhaust air-fuel ratio fluctuates. That is, when the three-way catalyst device has deteriorated, the degree of richness of the outflow exhaust air-fuel ratio gradually decreases with repeated increase-decrease patterns of relatively short cycles. When the outflow exhaust air-fuel ratio fluctuates in this manner, the output voltage of the downstream-side air-fuel ratio sensor 15 fluctuates substantially corresponding to the fluctuations of the outflow exhaust air-fuel ratio, as indicated in FIG. 7F. That is, the output voltage of the downstream-side air-fuel ratio sensor 15 gradually decreases with repeated increase-decrease patterns.

A comparison value calculated by comparing the length of a locus of the output voltage of the upstream-side air-fuel ratio sensor 13 (hereinafter, referred to as "upstream-side locus length") and the length of a locus of the output voltage of the downstream-side air-fuel ratio sensor 15 (hereinafter, referred to as "downstream-side locus length") occurring when the three-way catalyst device has deteriorated is different from such a comparison value obtained when the three-way catalyst device is normal. For example, the ratio of the downstream-side locus length to the upstream-side locus length (hereinafter, referred to as "locus length ratio") becomes greater when the three-way catalyst device is abnormal than when the three-way catalyst device is normal. Therefore, utilizing this fact, it is possible to determine that the three-way catalyst device has deteriorated when the locus length ratio becomes greater than a predetermined criterion value. However, in this invention, a device for further increasing the precision in determining catalyst deterioration is provided.

Figure 8:
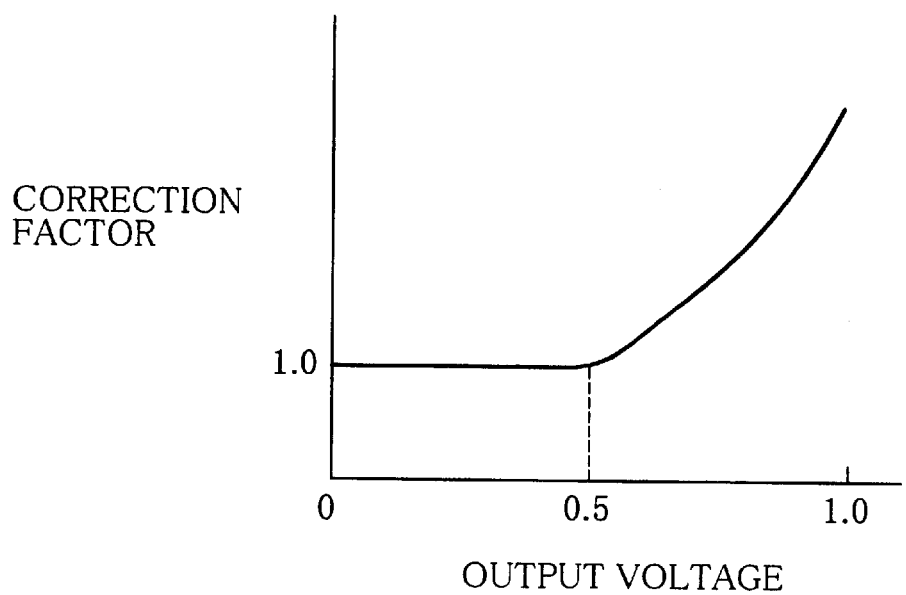
FIG. 8 is a diagram indicating a correction factor for correcting the output voltage of a downstream-side air-fuel ratio sensor.
Figure 9:
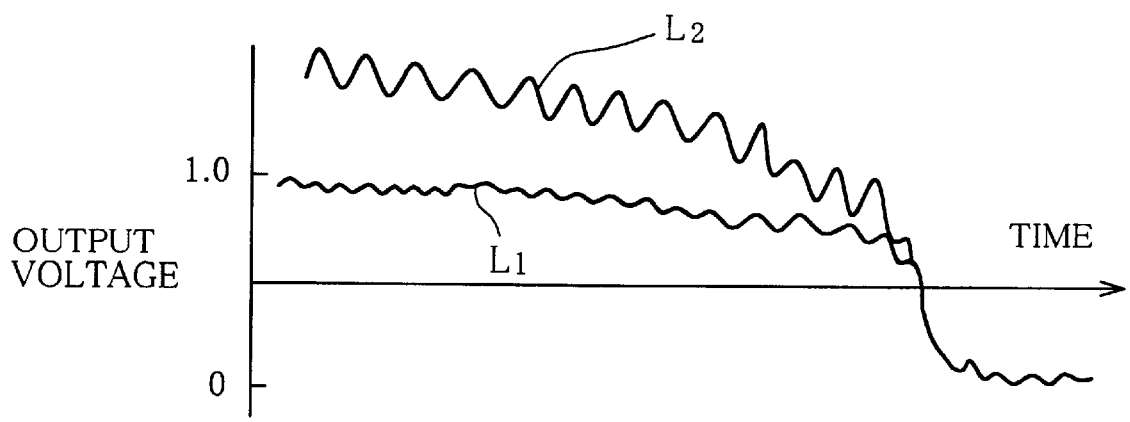
FIG. 9 is a diagram indicating the corrected output voltage of the downstream-side air-fuel ratio sensor.

That is, due to an output characteristic of the air-fuel ratio sensors, the output voltage fluctuation value of the downstream-side air-fuel ratio sensor 15 per unit outflow exhaust air-fuel ratio fluctuation value (hereinafter, simply referred to as "output fluctuation rate") decreases with increases in the output voltage of the downstream-side air-fuel ratio sensor 15. This means that the locus length ratio decreases with increases in the output voltage of the downstream-side air-fuel ratio sensor 15, where the degree of deterioration of the three-way catalyst device is fixed. That is, when the output voltage of the downstream-side air-fuel ratio sensor 15 is relatively great, it may be determined that the three-way catalyst device has not deteriorated although it actually has deteriorated. Therefore, in the invention, the output voltage of the downstream-side air-fuel ratio sensor 15 is corrected by multiplying it by a correction factor indicated in FIG. 8, and a locus length ratio is calculated based on the thus-corrected output voltage. As indicated in FIG. 8, the correction value increases in a quadratic curve fashion with increases in the output voltage of the downstream-side air-fuel ratio sensor 15. Therefore, as indicated in FIG. 9, a locus L1 of the pre-correction output voltage of the downstream-side air-fuel ratio sensor 15 is corrected to a locus L2. In this case, the output fluctuation rate is substantially constant regardless of values of output voltage of the downstream-side air-fuel ratio sensor 15. By using the thus-corrected output voltage of the downstream-side air-fuel ratio sensor 15, it becomes possible to precisely determine or evaluate deterioration of the three-way catalyst device, regardless of values of output voltage of the downstream-side air-fuel ratio sensor 15.

Figure 10:
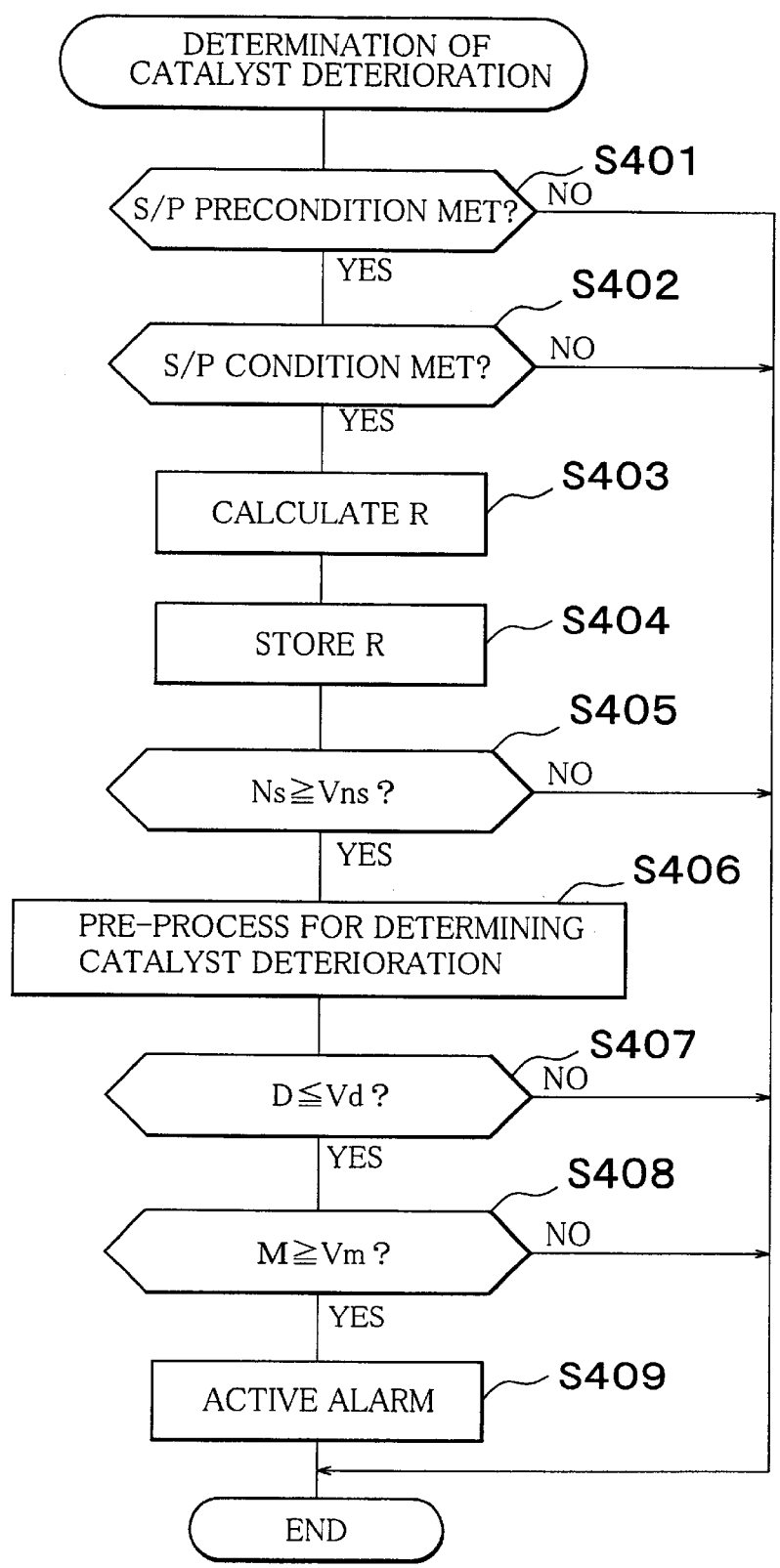
FIG. 10 is a flowchart for determination of catalyst deterioration.

The determination of catalyst deterioration will be described with reference to the flowchart of FIG. 10. First in step 401, it is determined whether the engine operational state meets a condition for permitting calculation of a locus length ratio, that is, whether a precondition for permitting execution of locus length ratio sampling (S/P precondition) is met. The S/P precondition includes a condition that the warm-up of the engine has been completed, a condition that the warm-up of the three-way catalyst device has been completed, a condition that the air-fuel ratio feedback control is being executed, and a condition that the learning of air-fuel ratio has been completed. If it is determined in step 401 that the S/P precondition is met, the process proceeds to step 402.

In step 402, it is determined whether the engine operational state occurring immediately prior to execution of the catalyst deterioration determination meets a condition for permitting calculation of a locus length ratio (S/P condition). The S/P condition herein includes a condition that the change in the engine revolution speed is small, a condition that the change in the negative pressure in the intake passage is small, a condition that the change in the inflow exhaust air-fuel ratio is small, a condition that the air-fuel ratio feedback control is being executed, a condition that the number of times of saturation of the oxygen absorbing/releasing capability of the three-way catalyst device is small, a condition that a so called fuel cut operation of temporarily stopping the fuel injection is being executed, a condition that an operation of temporarily increasing the amount of fuel injected in order to curb an excessive engine temperature increase is not being executed, and a condition that a predetermined time has elapsed following the previous locus length ratio calculation. If it is determined in step 402 that the S/P condition is met, the process proceeds to step 403, in which a locus length ratio R is calculated. Subsequently in step 404, the calculated locus length ratio R is stored as a unit of data. The locus length ratio R is the ratio of the length of a locus of the output voltage of the downstream-side air-fuel ratio sensor 15 corrected by a correction value read from a map as indicated in FIG. 8 to the length of a locus of the output voltage of the upstream-side air-fuel ratio sensor 13 as mentioned above.

Subsequently in step 405, it is determined whether the number of units of stored data Ns regarding the locus length ratio R is equal to or larger than Vns (Ns≧Vns). If it is determined in step 405 that Ns≧Vns, the process proceeds to step 406, in which a pre-process for determination of catalyst deterioration is executed. That is, the maximum and minimum values are excluded from the stored data regarding the locus length ratio R.

Subsequently in step 407, it is determined whether the population variance D of the stored data regarding the locus length ratio R is at most a predetermined criterion value Vd (D≦Vd). If it is determined in step 407 that D≦Vd, the process proceeds to step 408, in which it is determined whether the population mean M is at least a predetermined criterion value Vm (M≧Vm). If it is determined that M≧Vm, it is considered that the three-way catalyst device has deteriorated, and the process proceeds to step 409, in which the alarm 40 is activated.

If it is determined in step 401 that the S/P precondition is not met, or if it is determined in step 402 that the S/P condition is not met, or if it is determined in step 405 that Ns<Vns, or if it is determined in step 407 that D>Vd, or if it is determined in step 408 that M<Vm, the process ends without executing the determination regarding catalyst deterioration.

Although in the foregoing embodiment the output voltage of the downstream-side air-fuel ratio sensor is corrected, it is also possible to correct the predetermined criterion value used to determine whether the three-way catalyst device has deteriorated. In this case, the predetermined criterion value is corrected so that the predetermined criterion value decreases with increases in the output voltage of the downstream-side air-fuel ratio sensor. In this manner, advantages substantially the same as those of the foregoing embodiment can be achieved.

While the present invention has been described with reference to what is presently considered to be a preferred embodiment thereof, it is to be understood that the present invention is not limited to the disclosed embodiment or constructions. On the contrary, the present invention is intended to cover various modifications and equivalent arrangements.

What is claimed is:

1. A catalyst deterioration determining apparatus in an internal combustion engine having an exhaust passage that discharges exhaust gas from the internal combustion engine, and a three-way catalyst device that is disposed in the exhaust passage and has an oxygen absorbing/releasing capability, comprising:

an upstream-side air-fuel ratio sensor that is disposed in a portion of the exhaust passage located upstream of the three-way catalyst device, and that outputs an upstream-side output value in accordance with an air-fuel ratio of the exhaust gas flowing into the three-way catalyst device;

a downstream-side air-fuel ratio sensor that is disposed in a portion of the exhaust passage located downstream of the three-way catalyst device, and that outputs a downstream-side output value in accordance with the air-fuel ratio of the exhaust gas flowing out of the three-way catalyst device;

corrector means for correcting the downstream-side output value in accordance with the downstream-side output value;

calculator means for calculating a comparison value by comparing a length of an upstream-side output locus formed by the upstream-side output value and a length of a downstream-side corrected output locus formed by the corrected downstream-side output value; and determiner means for determining whether the three-way catalyst device has deteriorated by comparing the comparison value with a predetermined criterion value.

2. A catalyst deterioration determining apparatus according to claim 1, wherein the corrector means increases an amount of correction of the downstream-side output value with an increase in a difference between the downstream-side output value and an output value of the downstream-side air-fuel ratio sensor corresponding to a stoichiometric air-fuel ratio.

3. A catalyst deterioration determining apparatus according to claim 2, wherein when the air-fuel ratio is on a rich side, the downstream-side air-fuel ratio sensor outputs a voltage that is higher than the output voltage of the downstream-side air-fuel ratio sensor corresponding to the stoichiometric air-fuel ratio, and wherein the corrector more greatly increases the downstream-side output value when a value obtained by subtracting the output value of the downstream-side air-fuel ratio sensor corresponding to the stoichiometric air-fuel ratio from the downstream-side output value becomes greater.

4. A catalyst deterioration determining apparatus according to claim 1, wherein each of the upstream-side air-fuel ratio sensor and the downstream-side air-fuel ratio sensor is an oxygen sensor that outputs an output value in accordance with an oxygen concentration in the exhaust gas.

5. A catalyst deterioration determining apparatus according to claim 1, wherein the comparison value is a ratio between the length of the upstream-side output locus and the length of the downstream-side corrected output locus.

6. A catalyst deterioration determining apparatus according to claim 5,
wherein the comparison value is a ratio of the length of the downstream-side corrected output locus to the length of the upstream-side output locus, and
wherein when the comparison value is greater than a predetermined criterion value, the determiner means determines that the three-way catalyst device has deteriorated.

7. A catalyst deterioration determining apparatus in an internal combustion engine having an exhaust passage that discharges exhaust gas from the internal combustion engine, and a three-way catalyst device that is disposed in the exhaust passage and has an oxygen absorbing/releasing capability, comprising:
an internal combustion engine;
an upstream-side air-fuel ratio sensor that is disposed in a portion of the exhaust passage located upstream of the three-way catalyst device, and that outputs an upstream-side output value in accordance with an air-fuel ratio of the exhaust gas flowing into the three-way catalyst device;
a downstream-side air-fuel ratio sensor that is disposed in a portion of the exhaust passage located downstream of the three-way catalyst device, and that outputs a downstream-side output value in accordance with the air-fuel ratio of the exhaust gas flowing out of the three-way catalyst device;
calculator means for calculating a comparison value by comparing a length of an upstream-side output locus formed by the upstream-side output value and a length of a downstream-side output locus formed by the downstream-side output value;
corrector means for correcting a criterion value to be compared with the comparison value in order to determine whether the three-way catalyst device has deteriorated, in accordance with the downstream-side output value; and
determiner means for determining whether the three-way catalyst device has deteriorated by comparing the comparison value and the corrected criterion value.

8. A catalyst deterioration determining apparatus according to claim 7, wherein the corrector means increases an amount of correction of the downstream-side output value with an increase in a difference between the downstream-side output value and an output value of the downstream-side air-fuel ratio sensor corresponding to a stoichiometric air-fuel ratio.

9. A catalyst deterioration determining apparatus according to claim 8,
wherein when the air-fuel ratio is on a rich side, the downstream-side air-fuel ratio sensor outputs a voltage that is higher than the output voltage of the downstream-side air-fuel ratio sensor corresponding to the stoichiometric air-fuel ratio, and
wherein the corrector means more greatly increases the criterion value when a value obtained by subtracting the output value of the downstream-side air-fuel ratio sensor corresponding to the stoichiometric air-fuel ratio from the downstream-side output value becomes greater.

10. A catalyst deterioration determining apparatus according to claim 7, wherein each of the upstream-side air-fuel ratio sensor and the downstream-side air-fuel ratio sensor is an oxygen sensor that outputs an output value in accordance with an oxygen concentration in the exhaust gas.

11. A catalyst deterioration determining apparatus according to claim 7, wherein the comparison value is a ratio between the length of the upstream-side output locus formed by the upstream-side output value and the length of the downstream-side output locus formed by the downstream-side output value.

12. A catalyst deterioration determining apparatus according to claim 11,
wherein the comparison value is a ratio of the length of the downstream-side output locus to the length of the upstream-side output locus, and
wherein when the comparison value is greater than the corrected criterion value, the determiner means determines that the three-way catalyst device has deteriorated.

13. A catalyst deterioration determining method comprising:
acquiring a first output value from an upstream-side air-fuel ratio sensor positioned upstream of a three-way catalyst device disposed in an exhaust gas of an internal combustion engine, the first output value being in accordance with an air-fuel ratio of an exhaust gas flowing into the three-way catalyst device;
acquiring a second output value from a downstream-side air-fuel ratio sensor positioned downstream of the three-way catalyst device, the second output value being in accordance with the air-fuel ratio of the exhaust gas flowing out of the three-way catalyst device;
correcting the second output value in accordance with a magnitude of the second output value;
calculating a comparison value by comparing a length of an upstream-side output locus formed by the first output value and a length of a downstream-side corrected output locus formed by the corrected second output value; and
determining whether the three-way catalyst device has deteriorated by comparing the comparison value and a predetermined criterion value.

14. A catalyst deterioration determining method according to claim 13, wherein an amount of correction made in the correcting step increases with an increase in a difference between the second output value and an output value of the downstream-side air-fuel ratio sensor corresponding to a stoichiometric air-fuel ratio.

15. A catalyst deterioration determining method according to claim 13, wherein the comparison value is a ratio between the length of the upstream-side output locus and the length of the downstream-side corrected output locus.

16. A catalyst deterioration determining method comprising:
acquiring a first output value from an upstream-side air-fuel ratio sensor positioned upstream of a three-way catalyst device disposed in an exhaust gas of an internal combustion engine, the first output value being in accordance with an air-fuel ratio of an exhaust gas flowing into the three-way catalyst device;

acquiring a second output value from a downstream-side air-fuel ratio sensor positioned downstream of the three-way catalyst device, the second output value being in accordance with the air-fuel ratio of the exhaust gas flowing out of the three-way catalyst device;

calculating a comparison value by comparing a length of an upstream-side output locus formed by the first output value and a length of a downstream-side output locus formed by the second output value;

correcting a criterion value to be compared with the comparison value in order to determine whether the three-way catalyst device has deteriorated, in accordance with the second output value; and determining whether the three-way catalyst device has deteriorated by comparing the comparison value and the corrected criterion value.

17. A catalyst deterioration determining method according to claim 16, wherein an amount of correction made in the correcting step increases with an increase in a difference between the second output value and an output value of the downstream-side air-fuel ratio sensor corresponding to a stoichiometric air-fuel ratio.

18. A catalyst deterioration determining method according to claim 16, wherein the comparison value is a ratio between the length of the upstream-side output locus and the length of the downstream-side output locus.

* * * * *